United States Patent Office 3,418,918
Patented Dec. 31, 1968

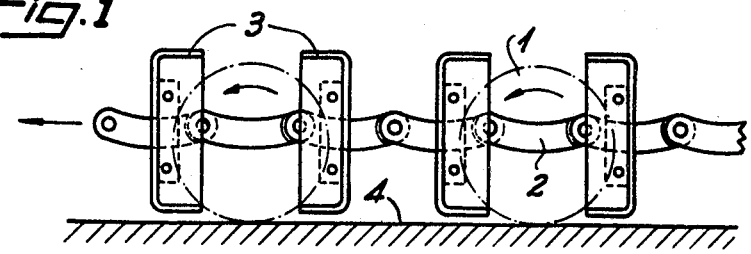
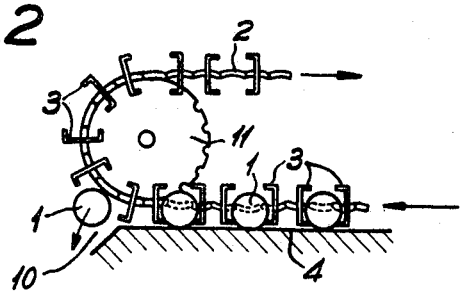
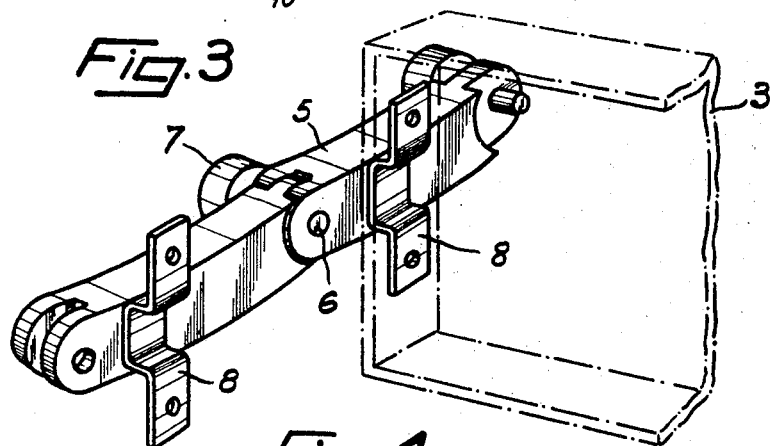
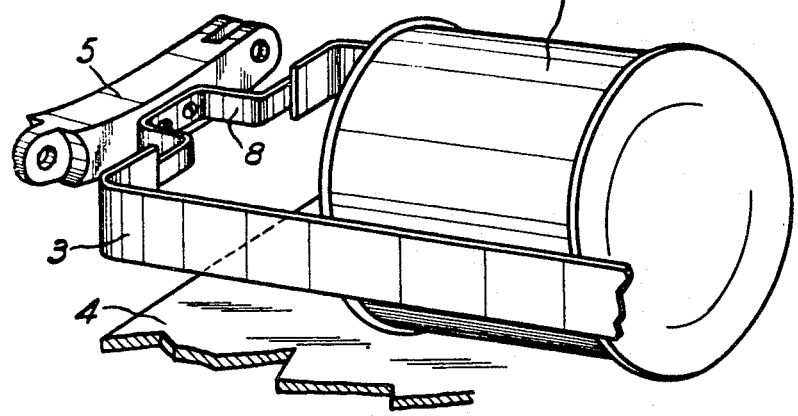

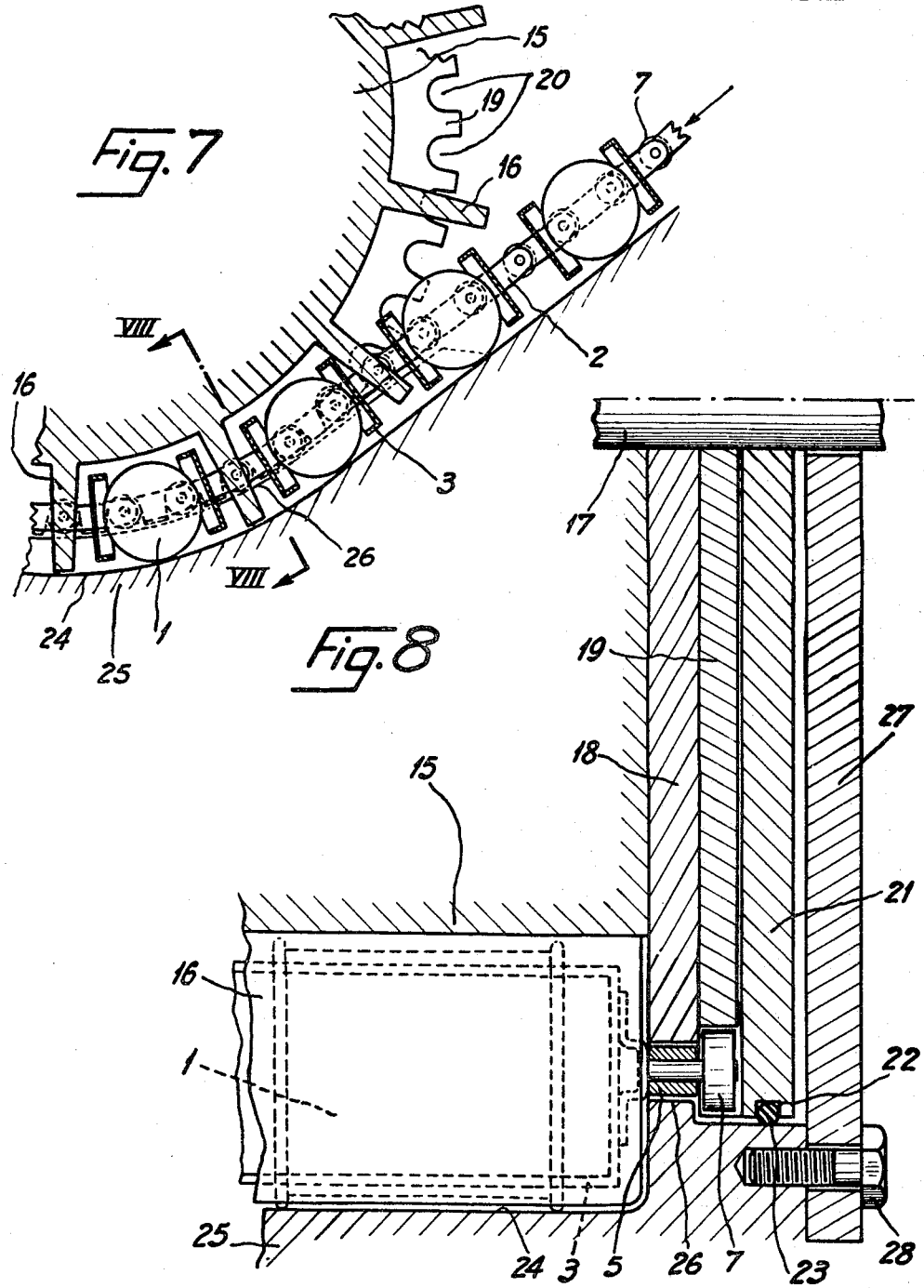

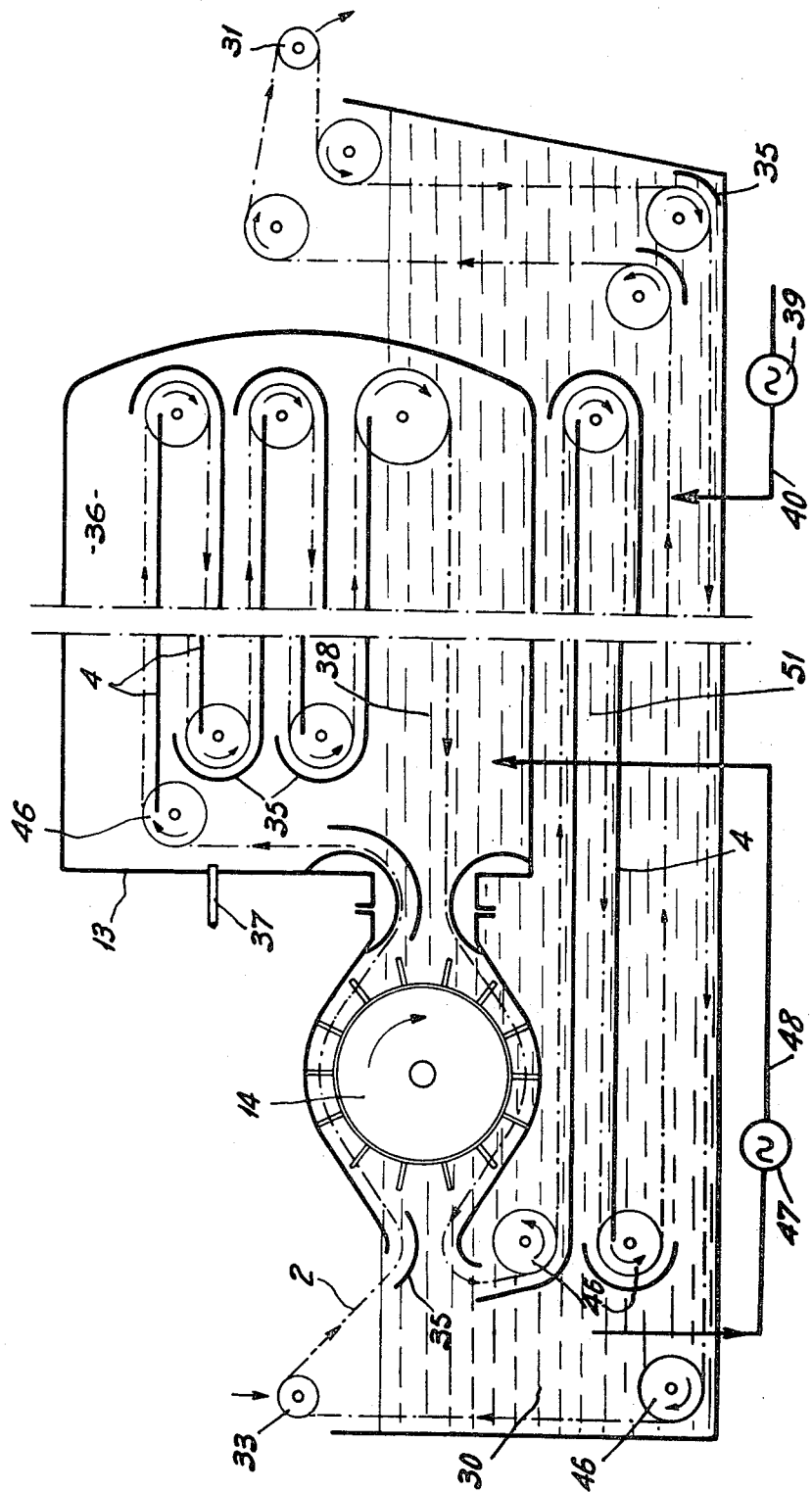

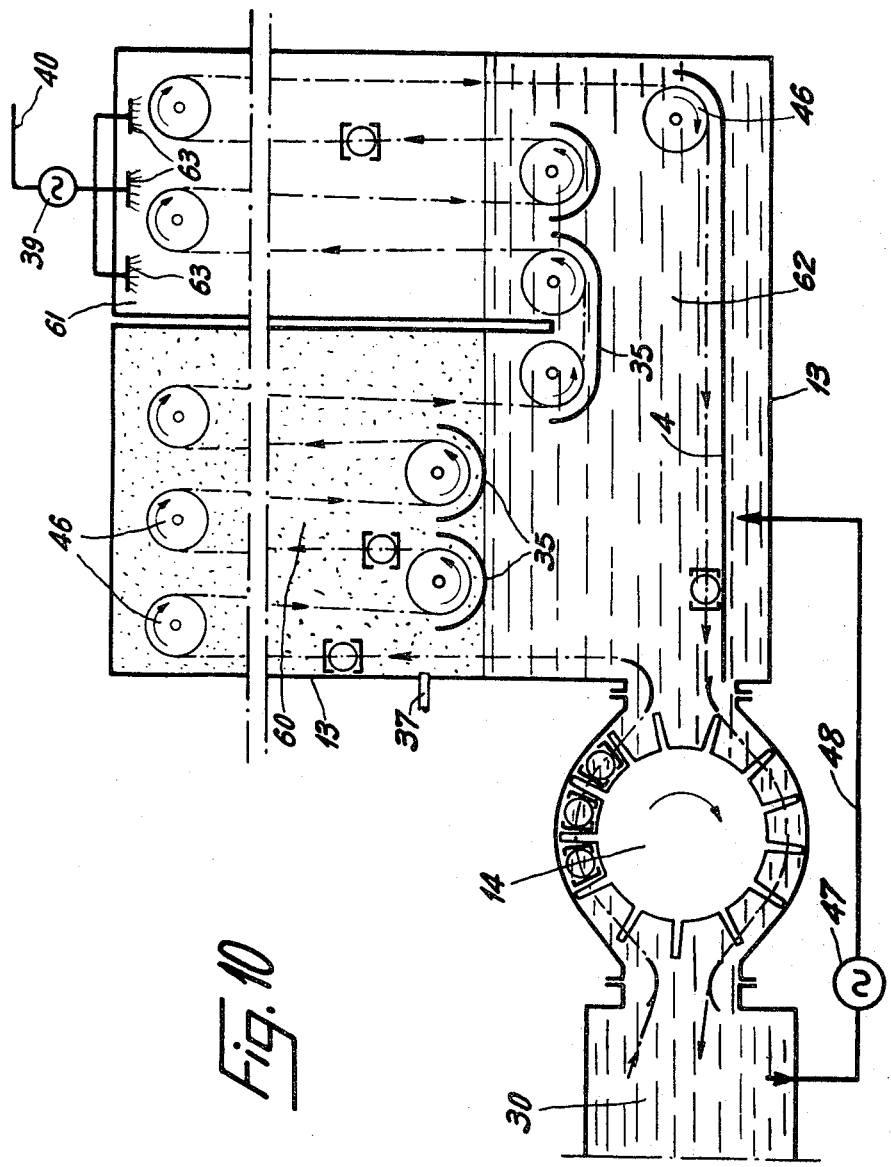

3,418,918
STERILIZATION APPARATUS
Max Beauvais, Saint-Georges-le-Motel, Eure, and Claude Moreau, Nantes, Loire Atlantique, France; said Moreau assignor to Societe Financiere et Industrielle des Ateliers et Chantiers de Bretagne, Prairie au Duc-Nantes Loire-Atlantique, France, a company of France
Filed Jan. 5, 1967, Ser. No. 607,523
Claims priority, application France, Jan. 14, 1966, 45,957
5 Claims. (Cl. 99—362)

ABSTRACT OF THE DISCLOSURE

A sterilization apparatus, more particularly for the treatment of containers containing products such as food or the like, comprising a chamber containing a sterilization fluid and a cooling liquid and a conveyor adapted to move the containers in the chamber portions containing the sterilization fluid and the cooling liquid, a sealing system being provided for introducing the containers into the chamber and withdrawing them therefrom without substantially changing the pressure in the said chamber.

---

This invention relates to the sterilization of products such as foodstuffs or pharmaceutical products in containers of varying forms, e.g. tins and bottles or jars. It relates more particularly to apparatus for performing such sterilization continuously, the containers being kept under a permanent counter-pressure, this being a considerable advantage, particularly for the high-temperature treatment of some tins and for the high-temperature treatment of bottles and glass jars, the caps of which are likely to be torn off under the effect of the internal pressure forming during sterilization.

The apparatus according to the invention comprises essentially a chamber containing sterilization fluid such as steam, hot water or an air-steam mixture and a cooling liquid, e.g. water, and a conveyor adapted to move the containers through the portions of the said chamber respectively containing the sterilization fluid and cooling liquid, a sealing system being provided to allow the containers to be introduced into the chamber and withdrawn therefrom, preferably at a level below the level occupied by the liquid in the said chamber without substantially affecting the pressure in the chamber.

Preferably, the conveyor enters the chamber and leaves the same through a sealing system so that the containers can be loaded on to and withdrawn from the conveyor outside the chamber, thus avoiding any transfer of containers in the apparatus and providing a high degree of operational reliability.

Advantageously, the conveyor is arranged so that the containers can rotate on themselves, thus greatly reducing the sterilization time, e.g. the containers rolling on appropriate bearing surfaces during at least part of the path covered by the said containers in the machine, to which end the containers are either cylindrical or enclosed in perforated cylindrical jackets.

The sealing system advantageously comprises a rotary drum immersed in the cooling water and serving both for the entry and exit of the containers. Of course separate drums could be provided for the entry and exit.

The above-mentioned device or devices provide maximum sealing but of course they cannot operate without some leakage. With the present apparatus such leakage is unimportant since it is below the cooling flow and the cooling water has to be renewed in any case. The leakage can thus be returned to the chamber of the apparatus.

The apparatus according to the invention has the advantage of hydrostatic appliances, i.e., continuity of movement of the containers together with the additional possibility of operating at high pressure without increasing the volume of the apparatus, and the possibility of using horizontal movement whereby the containers can be rotated.

The invention is illustrated by way of example in the accompanying drawings, in which:

FIGURE 1 is a diagrammatic elevation showing a first means of driving the containers for sterilization;

FIGURE 2 is a similar view to FIGURE 1 showing how the containers leave the conveyor;

FIGURE 3 is a perspective detail of a portion of the conveyor chain;

FIGURE 4 is another detail in perspective showing a variant cross-member for the conveyor;

FIGURE 7 is a detail in longitudinal section showing how the containers pass through the sealing system of the apparatus;

FIGURE 8 is a section on the line VIII—VIII in FIGURE 7;

FIGURES 9 and 10 are general diagrams showing variant embodiments of the apparatus.

Figure 5:
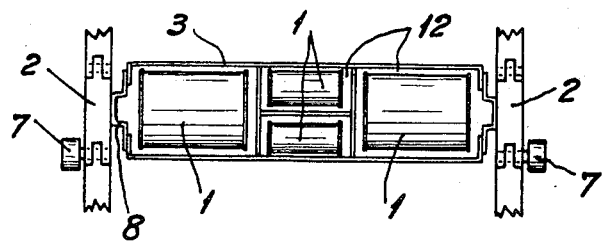
FIGURE 5 is a plan view of the variant shown in FIGURE 4.

In the example illustrated in FIGURES 1 and 2, the containers 1 which are required to be sterilized are moved by a conveyor 2 comprising two parallel elements, e.g. chains, connected by cross-members 3, by means of which the said containers are pushed or lifted depending upon the orientation of the portion of the conveyor in question.

When said portion is substantially horizontal, the containers 1 move by rolling on support surfaces (FIG. 1), and to this end, if the containers are not cylindrical, they are introduced into the apparatus after having been placed in perforated cylinders.

As shown in FIGURE 3, the conveyor chains are formed by links 5, which are arched longitudinally, for reasons to be explained hereinafter. The links are connected by pins 6 which on the outside bear a roller 7. On the inner surface the links, or at least some of them, are provided with flanges 8 to receive the cross-members 3.

The latter may be disposed perpendicularly to the links bearing them, as shown in FIGURES 1 to 3, or extend in the general plane of the conveyor as shown in FIGURES 4 and 5.

In the former case the cross-members are in the form of flat dishes and are arranged in pairs with one facing the other, the containers being disposed between two facing dishes. Depending upon the dimensions of the container, one or more ordinary links may be interposed between two cross-member carrying links so that the containers can be held captive between the cross-members while having the possibility of rolling on the surfaces 4 where applicable. As shown in FIGURE 2, the containers 1 can leave the conveyor at places, e.g. 10, as the chains pass over the reversing wheels 11, as a result of the spacing of the cross-members at such places.

In the second case (FIGURES 4 and 5), the cross-members 3 are in the form of frames which if necessary are subdivided into compartments 12 in which containers of various dimensions can be placed and, more particularly, a number of rows of small containers can be conveyed in the same amount of space as a large container.

The sterilization apparatus comprises a sterilization and cooling chamber 13 (FIGURES 6, 9 and 10) which will be described in detail hereinafter and into which the containers are introduced and then withdrawn from the same by sealing system 14 shown in detail in FIGURES 7 and 8.

This sealing system comprises a drum, the central part of which is formed by a rotor 15 having blades 16 between which the pairs of cross-members 3 accommodating the containers 1 are received.

The rotor 15 is keyed on a drive shaft 17 (FIGURE 8) which rotates intermittently or continuously and on which a solid disc 18 is secured on each side of the rotor, the links 5 of the chains engaging the periphery of said disc, the curvature of the latter (see FIGURES 1 to 5) being designed to minimise the clearances. The discs 18 also have substantially the same width as the links 5.

Wheels 19 are keyed on the shaft 17 outside the discs 18 and have notches 20 engaging the rollers 7 of the conveyor chains 2 in order to drive the latter.

The drum is completed by circular plates 21 the periphery of which is formed with a groove 22 receiving a gasket 23 (FIGURE 8).

The drum rotates in a stator formed by shells 24 each having a track 25 in which the blades 16 fit with minimum clearance. The said track is banked by skirts 26 against which the links 5 of the chains move, again with minimum clearance, and on which the lateral gaskets 23 bear.

The stator is completed by side covers 27 secured by bolts 28 to the shells 24 (FIGURE 8).

Figure 6:
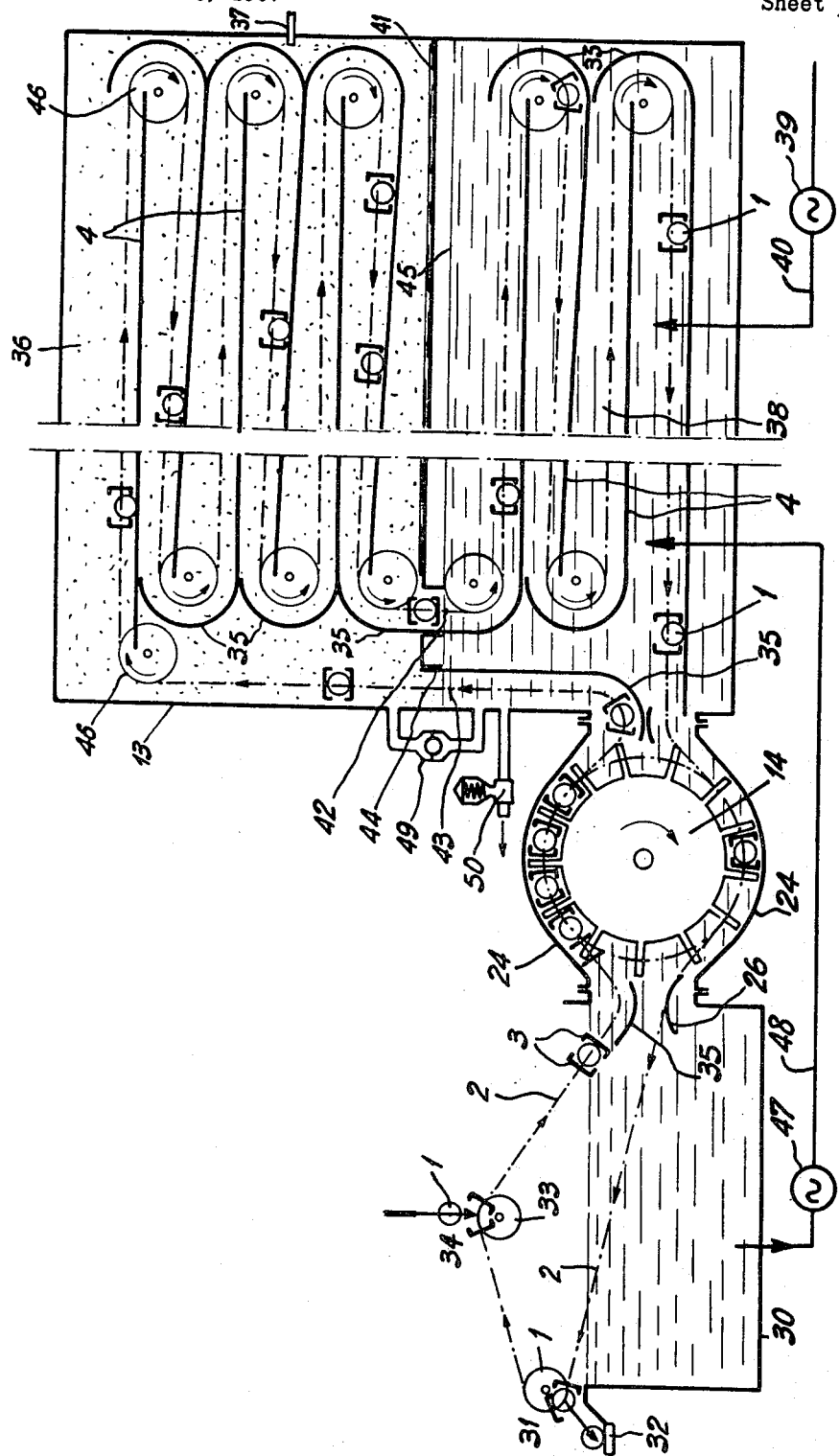
FIGURE 6 is a general diagrammatic view of an apparatus according to the invention.

In the embodiment illustrated in FIGURE 6, the sealing system 14 is preceded by a tank 30 filled with cold water through which the bottom run of the conveyor 2 moves, the conveyor chains being wound over the reversing wheels 31 of an exit station 32.

From there the chains pass over reversing wheels 33 at the loading station 34, where the containers are introduced into the conveyor, which moves towards the sealing system 14.

The various reversing wheels are similar to the wheels 19, 20 already described, except for their diameter (FIGURES 7 and 8). The top run of the conveyor 2 enters the sealing system 14 beneath the top shell 24 thereof and passes over fixed ramps over a curved guide plate 35 which prevents the containers 1 from escaping from the cross-members 3.

Plates 35 of this type are also provided at the entry to the chamber 13 and generally wherever the conveyor changes direction or the said plates are usable.

The chamber 13, which forms an integral counter-pressure sterilisation cooling autoclave is divided into two compartments, i.e., a top sterilization compartment 36 receiving a suitable sterilization fluid, e.g., steam, hot water or an air and steam mixture at the required pressure via a conduit 37, and a bottom cooling compartment 38 which receives cold water by means of a pump 39 and a conduit 40 via a partition 41 formed with two apertures 42 and 43 for the passage of the conveyor 2. These apertures have turned-down edges 44 to form an air cushion 45 which acts as a thermal insulation between the two compartments.

The conveyor passes over reversing wheels 46 suitably disposed and, if necessary, associated with curved guide plates 35. Support plates 4 are provided beneath the horizontal or substantially horizontal portions of the conveyor and, as will be seen in the drawing, are disposed so as to allow the containers 1 to pass firstly through the sterilization compartment and then the cooling compartment of the apparatus. Vertical guide plates may be provided wherever necessary, depending upon the type of cross-members 3 selected.

After undergoing the required cooling in the bottom compartment 38, the containers leave by the bottom track of the sealing system 14.

Water leakage with the sealing system is minimum and does not have any adverse effect because it contributes to exacuation of the heated water, which is replaced by fresh water. A pump 47 and a conduit 48 may be provided to return all or part of such leakage to the compartment 38.

The level of liquid in chamber 13 is maintained at a predetermined value by means of an automatic monitoring device which controls, for this purpose, pump 39 and an auxiliary discharge valve 50.

The plates 4 and 35 are so arranged as to channel the cooling flow in countercurrent with respect to the containers which are required to be cooled.

In the variant shown in FIGURE 9, the exit tank 30 continues beneath the drum 14 and the chamber 13 and reversing wheels 13, together with guide surfaces 4 and 35 are provided in the extension 51 of the tank so that the chain and containers 1 can pass therethrough.

In this way, only the start of the cooling operation is performed under pressure, the remainder being effected at atmospheric pressure after the outlet of the sealing system. An arrangement of this kind can be applied to tins. The pump 39 feeds the extension 51 and the tank 30 while the pump 47 delivers water to the compartment 38 of the chamber 13.

In the above-described embodiments, the apparatus is so arranged that the containers 1 roll on the support plates 4.

Such rolling is very favourable to heating the contents of the containers 1 and greatly reduces the sterilization times because it accelerates convection inside the contained contents, particularly in the case of thick or pasty products in which the natural convection is slow, while it allows higher sterilization temperatures than is conventional. Since the product is in permanent movement inside the container, there is less risk of the product being overheated or burnt locally on the container walls.

Figure 11:
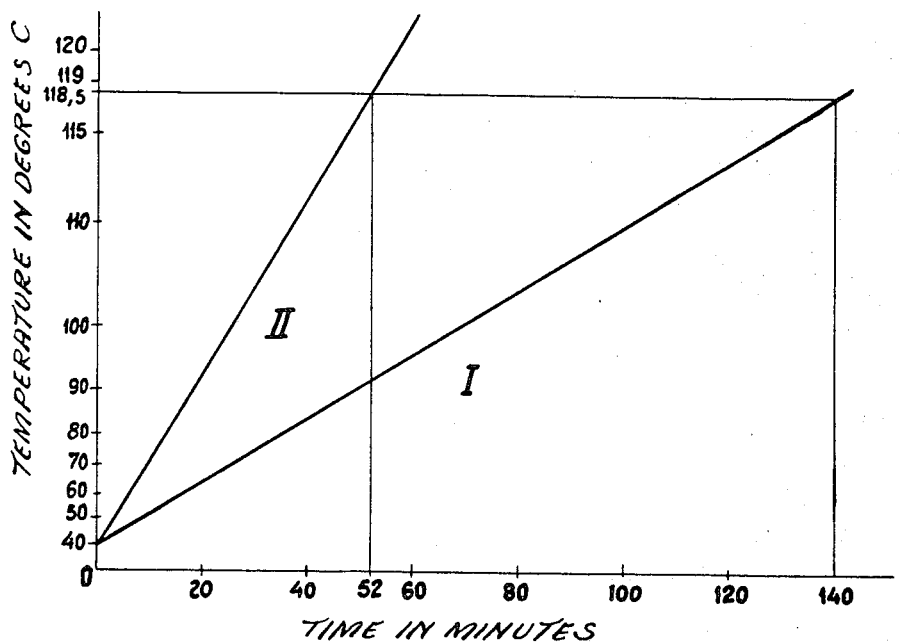
FIGURE 11 is a graph showing the effects of rotation of the container upon the heating of the container contents.

FIGURE 11 is a graph showing the steam heating at 120° C. of 1 kg. tins containing a thick product. The x-axis denotes the time in minutes, while the y-axis indicates the temperature in ° C. to a logarithmic scale.

The straight line I refers to the heating time of a tin which was not rotating: in 140 minutes the temperature of the contents of the tin increases from 40 to 118.5° C. The straight line II refers to a tin rotating according to the invention. The same internal temperature of 118.5° C. was reached in 52 minutes from the same initial temperature.

When the products for sterilization are sufficiently liquid for the natural convection to be adequate without the containers having to be rotated, the arrangement shown in FIGURE 10 may be used.

In this case the conveyor 2 passes into the chamber 13 along substantially vertical paths without any need for support plates 4. Only the curved plates 35 are associated with the wheels 46 where necessary, a single plate 4 being provided for the outgoing run of the conveyor. The space occupied by the apparatus in plan view can be reduced in this way.

The chamber 13 comprises two vertical compartments 60 and 61 connected to a common bottom tank 62 served by the drum 14 and fed by the pump 47, the conduit 48 of which starts from the inlet tank 30.

The compartment 60 receives steam via the conduit 37. The conduit 40 fed by pump 39 leads to the top of compartment 61, where it leads into injectors 63 which cool the containers by trickling.

What we claim is:

1. A sterilization apparatus, more particularly for the treatment of containers containing products such as foodstuffs or pharmaceutical products comprising a chamber adapted to be pressurized and adapted to contain a sterilization fluid in its upper portion and a cooling liquid in its upper portion and a cooling liquid in its lower portion, said chamber having an aperture formed therein below the operation level of said liquid; a conveyor comprising at least one chain and a plurality of cross members attached to said chain and adapted to receive said containers therebetween, said conveyor adapted to move the containers from a loading station located outside said chamber, into said chamber through said aperture, and then out of said chamber through said aperture to an exit station; a substantially cylindrical casing connected to said chamber around said aperture; and a drum rotatably mounted in said casing, said drum being provided with blades the pitch of which is such that a pair of cross-members together with the containers located therebetween can be accommodated between two consecutive blades, the outer diameter of said drum and the inner diameter of said casing being dimensioned to permit the passage of said conveyor and said containers into and out of said chamber without substantially changing the pressure in said chamber.

2. Apparatus according to claim 1, wherein a generally horizontal partition is provided in said chamber to form at least two compartments, said partition having a plurality of apertures extending therethrough for the passage of said containers, said apertures being bounded by folded over edges to maintain an insulating air cushion beneath said partition.

3. A sterilization apparatus as claimed in claim 1, further comprising a tank connected to said casing and adapted to be filled with cooling liquid, means being provided for maintaining the level of liquid in said tank above the outlet of said casing.

4. A sterilization apparatus as claimed in claim 3, wherein pumping means are provided for forcing liquid from said tank into said chamber.

5. A sterilization apparatus according to claim 3, wherein said conveyor is arranged so that the containers cover an additional cooling path in said tank.

References Cited

UNITED STATES PATENTS

| | | | |
|---|---|---|---|
| 802,254 | 10/1905 | Baker et al. | 99—364 |
| 1,418,572 | 6/1922 | Hoyt et al. | |
| 1,528,133 | 3/1925 | Ross. | |
| 1,570,235 | 1/1926 | Fooks | 99—362 |
| 1,987,414 | 1/1935 | Omsted | 99—362 |
| 2,338,258 | 1/1944 | Ray | 214—17.4 XR |
| 2,695,555 | 11/1954 | Carvallo | 99—362 |
| 2,585,213 | 2/1952 | Baker | 99—362 XR |
| 2,660,512 | 11/1953 | Webster. | |
| 3,101,995 | 8/1963 | Beauvais | 99—216 XR |

FOREIGN PATENTS 377,890  8/1932  Great Britain.

WALTER A. SCHEEL, *Primary Examiner.*

J. M. NEARY, *Assistant Examiner.*

U.S. Cl. X.R.

99—364, 366